June 17, 1930.   J. R. LEWIS   1,764,082
BRAKE LINING MACHINE
Filed Jan. 10, 1929
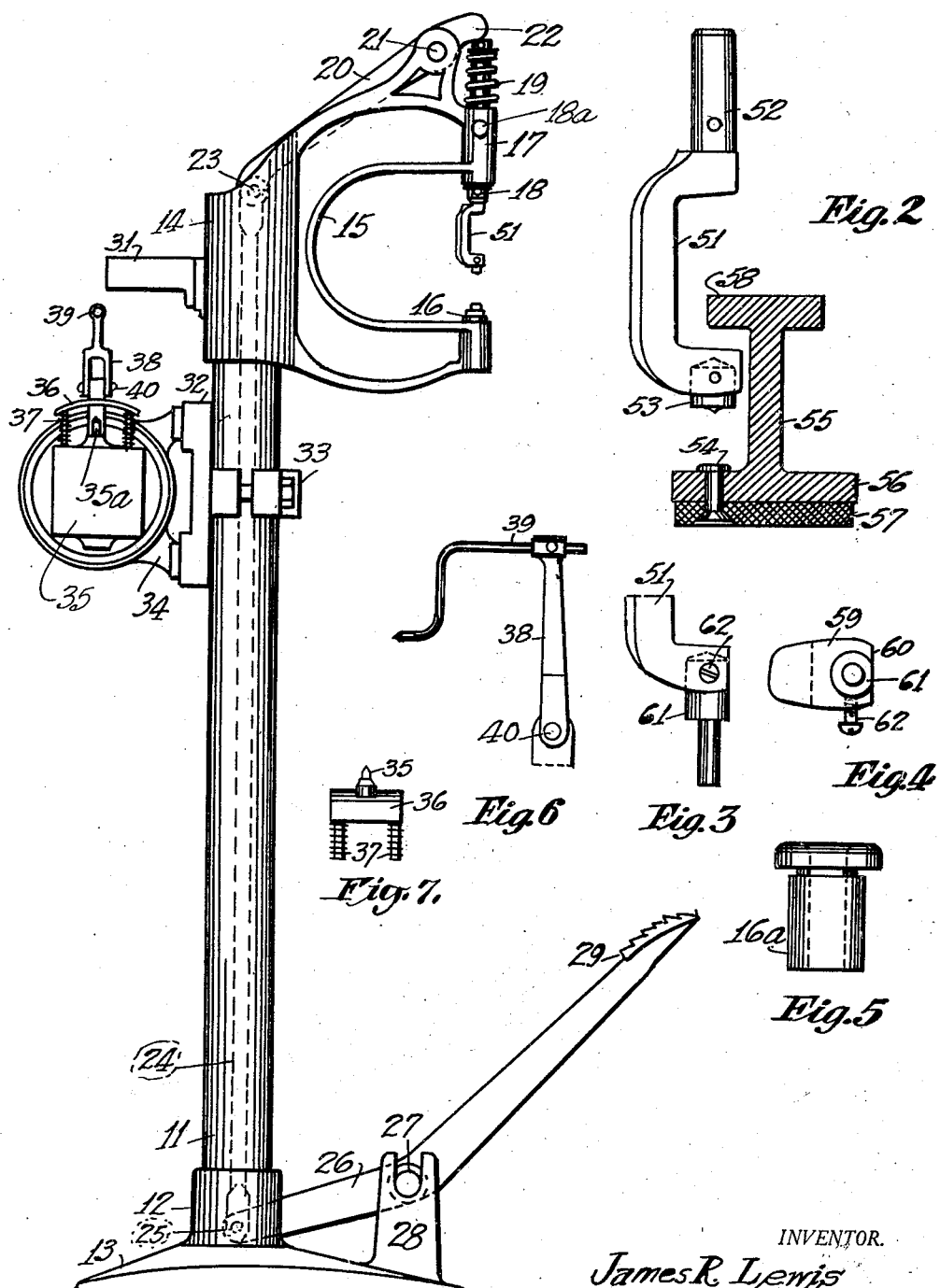
INVENTOR.
James R. Lewis
BY
M. A. Loughridge
ATTORNEY.

Patented June 17, 1930

1,764,082

UNITED STATES PATENT OFFICE

JAMES R. LEWIS, OF PHILADELPHIA, PENNSYLVANIA, ASSIGNOR TO BREEZE CORPORATIONS, OF NEWARK, NEW JERSEY, A CORPORATION OF NEW JERSEY

BRAKE-LINING MACHINE

Application filed January 10, 1929. Serial No. 331,504.

This invention relates to brake lining machines, that is to a type of riveting press for attaching brake linings to brake shoes such as are used in the automotive industry and it has for an object to provide a machine of this class which can be used to rivet brake linings to brake shoes of various shapes, a machine which is portable and occupies comparatively little space. Other objects of the invention will appear from the following specification and the accompanying drawings, in which, Fig. 1, is an elevation of a machine embodying my invention, Fig. 2 is an enlarged detail showing the application of the riveting tool to an I-beam type of brake shoe which is shown in section, Fig. 3 is a modification of the tool holder, Fig. 4 is an end view corresponding to Fig. 3, Fig. 5 is one form of anvil that may be used with this machine, Fig. 6 is a locating device for locating the position of the drill when drilling from the underside of the brake shoe and Figure 7 shows the brake shoe support with relation to Figure 6.

Brake shoes are usually provided with a lining of asbestos fabric which is used to engage the brake drum by friction and is thus worn away. It is necessary, therefore to reline the brake shoes with new fabric from time to time and the present machine is designed to facilitate this work. The brake lining is riveted to the brake shoe and as these shoes come in various shapes I have devised a novel type of tool holder whereby the machine can be adapted to the different types of brake shoes. The machine is operated by foot pressure for the punching and riveting operation and a motor operated drill is provided for drilling and counter-sinking the holes in the brake fabric for the rivets.

Referring to the drawings, 11 is a pipe stem supported by the socket 12 of the tripod base 13 and supports the operating head 14 which is developed into a jaw 15 having the anvil 16 on the lower side and the socket 17 on the upper side.

The plunger 18 is mounted in the socket 17 for vertical operation but is prevented from rotating by the stud 18ª engaging a spline in the plunger. A coil spring 19 holds this plunger normally in the elevated position.

The foot lever 26 is pivotally mounted in stand 28 on the base 13 at 27 and has a pedal at 29 by which it is operated. The inner end of this lever passes through a slot in the stem 11 to permit its free vertical movement and is connected at 25 to the pipe rod 24, the upper end of which connects at 23 to the lever 20 which is pivoted at 21 and has the projecting end 22, which is rounded, in engagement with the top of the plunger 18. It will be observed by this arrangement that when the lever 29 is depressed, the plunger 18 is also depressed, but to a much lesser extent and therefore through a considerable leverage. In this operation the rounded end of lever 20 rolls on the top of the plunger thereby avoiding a pivoted connection. A tool tray 31 may be provided at the back of the head as shown.

The bracket 32 is clamped at 33 to the stem 11 and supports the motor 34 to which the mechanism 35 is attached having the vertical spindle 35ª driven by the motor. The curved table 36 is supported by the mechanism 35 on pillars which slide vertically and is normally held extended by the coil springs on the pillars. An aperture in this table registers with the spindle 35ª so that when a brake shoe is placed on the table and the spindle rotated it is brought into engagement with the spindle by depressing the table and the drill operates from the underside.

As the position of the drill point cannot be seen it is necessary to provide a locating device for the drill. This comprises the arrangement best shown in Fig. 6, in which the vertical arm 38, pivoted to the mechanism at 40 carries the adjustably positioned locating pointer 39 which is adjusted to register with the drill point 35 when it is turned into the horizontal position. This facilitates drilling and counterboring new brake linings in register with the existing holes in the brake shoe.

The relation of the tool holder to the work is shown in Fig. 2. The tool holder 51 is provided with a stem 52 which is inserted in the plunger 18 according to the usual practice in tools of this type. The operating tool, such as the rivet set 53 is detachably secured in the opposite end of this holder. A common form of brake shoe uses the I-beam section as indicated at 55 with an outer flange 56 to which the brake lining 57 is secured by rivets 54 through the flange. The other side of the brake shoe is provided with a flange 58 and this flange intercepts the plane of the rivets as shown so that riveting by the use of common tools would be a difficult operation. By a novel construction in the tool holder this machine is adapted for riveting or similar operations on brake shoes of the type described. The tool holder is offset as indicated to clear the flange 58 and permit the required vertical movement for the proper operation of the tool.

In Figs. 3 and 4 a modification of the tool holder is shown in which the centre of the tool may be brought closely up to the flange 55. The projecting end of the holder 59 is machined down at 60 together with one side of the tool 61 which is held in place by the set screw 62. This enables the tool to operate upon rivets close to the flange 55.

The anvil shown at 16 is a solid stud. This may be replaced by the hollow stud 16ª shown in Fig. 5 for driving out rivets etc.

It is apparent that the novel features of this invention may be applied in a variety of ways and are not to be understood as limited to the application shown.

The tool holder 51 is shown as non-turning, but it should be understood that this part may be arranged to rotate in its socket, or the socket 18 may rotate, as desired according to the application of the machine.

Having thus described my invention, I claim:

A machine of the class described for riveting fabric to a flange of a brake shoe having an overhanging cross-section, comprising a head formed as a jaw with one member of the jaw provided with a socket and the opposing member formed to receive an anvil, a non-turning plunger operating in said socket, means for reciprocating said plunger, an off-set tool holder secured to said plunger having an aperture, and a tool having a cylindrical base with a flat side inserted in said aperture in said holder, said holder being machined to align with the flat side of said tool and said tool operating between the overhanging sections of the brake shoe.

In testimony whereof I affix my signature.

JAMES R. LEWIS.